(12) United States Patent
Itogawa

(10) Patent No.: US 11,934,723 B2
(45) Date of Patent: Mar. 19, 2024

(54) CONVERTING PJL PRINT DATA TO PDL PRINT DATA USING A CONVERSION RULE

(71) Applicant: BROTHER KOGYO KABUSHIKI KAISHA, Nagoya (JP)

(72) Inventor: Yoshihiro Itogawa, Mizuho (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 22 days.

(21) Appl. No.: 17/810,927

(22) Filed: Jul. 6, 2022

(65) Prior Publication Data

US 2023/0029436 A1 Jan. 26, 2023

(30) Foreign Application Priority Data

Jul. 20, 2021 (JP) ................................. 2021-119610

(51) Int. Cl.
*G06F 3/12* (2006.01)

(52) U.S. Cl.
CPC .......... *G06F 3/1248* (2013.01); *G06F 3/1203* (2013.01); *G06F 3/1297* (2013.01)

(58) Field of Classification Search
None
See application file for complete search history.

(56) References Cited

U.S. PATENT DOCUMENTS

2012/0307295 A1* 12/2012 Myoki ................. G06F 3/1206
358/1.15

FOREIGN PATENT DOCUMENTS

JP 2018-171757 A 11/2018

* cited by examiner

*Primary Examiner* — Eric A. Rust
(74) *Attorney, Agent, or Firm* — Scully, Scott, Murphy & Presser, PC

(57) ABSTRACT

A computer determines whether PDL data contained in a print job, which is obtained via a communication interface or an external interface, matches pre-conversion PDL data stored in a conversion rule in a non-volatile memory. When a type of converted PDL data associated with the pre-conversion PDL in the conversion rule matches a type of PDL data determined in a PJL converting process, PJL data that conversion is held is converted to the converted PDL data associated with the pre-conversion PJL data that matches the held PDL data in the conversion rule.

9 Claims, 11 Drawing Sheets

```
                                                 32
                                                  ↙
┌─────────────────────────────────────────────────────┐
│                                                     │
│ D1 ──→ %-12345X@PJL                                 │
│       ┌─────────────────────────────────────────┐   │
│       │ @PJL SET HOLD=OFF                       │ PJL PART
│       │ @PJL SET USERNAME="user1"               │   │
│       │ @PJL SET JOBNAME="office-PDF(A&A4)_1Page_.pdf"│
│       │ @PJL SET LOGINUSER="user1"              │   │
│       │ @PJL JOB NAME="office-PDF(A&A4)_1Page_.pdf"│
│       │ @PJL SET LOGINDOMAIN="AP"               │   │
│       │ @PJL PRINTLOG ITEM = 1,PRINTER          │   │
│ 32a ──→│ @PJL PRINTLOG ITEM = 2,Thu,13May 2021 17:06:55│
│       │ @PJL PRINTLOG ITEM = 3,user1            │   │
│       │ @PJL PRINTLOG ITEM = 4,APBIL2022283     │   │
│       │ @PJL SET JOBTIME = "20210513170655"     │   │
│       │ @PJL SET STRINGCODESET=UTF8             │   │
│ D2 ──→│ @PJL SET MEDIASIZE=LETTER               │   │
│       │ @PJL SET RENDERMODE=COLOR               │   │
│       │ @PJL SET COLORADAPT=ON                  │   │
│       │ @PJL SET RESOLUTION=600                 │   │
│       │ @PJL SET APTMODE=88H                    │   │
│       │ @PJL SET COLORMODE=AUTO                 │   │
│       │ @PJL SET BRIGHTNESS=0                   │   │
│       │ @PJL SET CONTRAST=0                     │   │
│       │ @PJL SET DENSITYRED=0                   │   │
│       │ @PJL SET DENSITYGREEN=0                 │   │
│       │ @PJL SET DENSITYBLUE=0                  │   │
│       │ @PJL SET SPECIALRED=0x000000            │   │
│       │ @PJL SET ECONOMODE=OFF                  │   │
│       │ @PJL SET LESSPAPERCURL=OFF              │   │
│       │ @PJL SET FIXINTENSITYUP=OFF             │   │
│ D3 ──→│ @PJL SET ORGOUTBIN=TRAY5                │   │
│       │ @PJL ENTER LANGUAGE=PCLXL               │   │
│       └─────────────────────────────────────────┘   │
│       ┌─────────────────────────────────────────┐   │
│       │ HP-PCL XL;2;0                           │ PDL PART
│       │ Measure_UB(0=eBinaryHighByteFirst)      │   │
│       │ UnitsPerMeasure_UI(xy:600 600)          │   │
│       │ ErrorReport_UB(3=eBackChAndErrPage)     │   │
│       │ BeginSession   [1]                      │   │
│       │   SorceType_UB(0=eDefault)              │   │
│       │   DataOrg_UB(1=eMillimeter)             │   │
│ 32b ──→│ OpenDataSource [2]                     │   │
│       │   Orientation_UB(0=ePortraitOrientation)│   │
│       │   MediaSource_UB(1=eAutoSelect)         │   │
│       │   MediaSize_UB(2=eA4Paper)              │   │
│       │   MediaType_UB(array[5]:dThin)          │   │
│       │   SimplexPageMode_UB(0=eSimplexFrontSide)│   │
│       │ BeginPage      [3]                      │   │
│       └─────────────────────────────────────────┘   │
│       ┌─────────────────────────────────────────┐   │
│       │ EndPage        [28]                     │   │
│       │ CloseDataSource [29]                    │   │
│       │ EndSession     [30]                     │   │
│ D4 ──→│ %-12345X@PJL EOJ NAME="office-PDF(A&A4)_1Page_.pdf"│
│ D5 ──→│ %-12345X                                │   │
│       └─────────────────────────────────────────┘   │
└─────────────────────────────────────────────────────┘
```

FIG. 4

CONVERSION RULE DATA 50

| CONVERSION RULE NUMBER | PRE-CONVERSION PJL DATA | | POST-CONVERSION PJL DATA | | POST-CONVERSION PCL DATA | |
|---|---|---|---|---|---|---|
| | TYPE | COMMAND | TYPE | COMMAND | TYPE | COMMAND |
| 1 | PJL | @PJL SET MEDIASIZE = LETTER | PJL | @PJL SET PAPER = LETTER | - | - |
| 2 | PJL | @PJL SET ORGOUTBIN = TRAY1 | - | | PCL | \<ESC\>&l1G |
| ... | ... | | | | | |
| 8 | PJL | @PJL SET ORGOUTBIN = TRAY5 | - | | PCL | \<ESC\>&l5G |
| 9 | PJL | @PJL SET JOBSEPARATION = OFF | - | | PCL | \<ESC\>&l0T |
| 10 | PJL | @PJL SET JOBSEPARATION = ON | - | | PCL | \<ESC\>&l1T |

| POST-CONVERSION PCLXL DATA | | |
|---|---|---|
| TYPE | ATTRIBUTE | |
| - | - | ... |
| PCLXL | MediaDestination e Face DownBin | ... |
| PCLXL | MediaDestination_UB(5=eExternalBin2) | ... |
| - | - | ... |
| - | - | ... |

FIG. 6

CONVERTING PJL PRINT DATA TO PDL PRINT DATA USING A CONVERSION RULE

REFERENCE TO RELATED APPLICATIONS

This application claims priority from Japanese Patent Application No. 2021-119610 filed on Jul. 20, 2021. The entire content of the priority application is incorporated herein by reference.

BACKGROUND ART

The present disclosures relate to technology for processing data described in the Printer Job Language (hereafter referred to as PJL).

There has been known a technique in which a printing device stores new PJL data transmitted from a PC and a process corresponding to the new PJL data in a PJL dictionary, and when the new PJL data is received from the PC, the device performs the process corresponding to the received new PJL data in the PJL dictionary.

DESCRIPTION

In the field of the printing device, in addition to improvements in performance and functionality, changes such as diversification of value offerings are taking place. However, in a printing system equipped with the printing device, updating the printing device to accommodate the above changes would place a heavy burden on the printing system to reconfigure the entire system.

According to aspects of the present disclosure, there is provided a printing device including an external interface, a non-volatile memory, a computer. The computer can obtain a print job containing PJL data and PDL data via the external interface, and perform a printing process in accordance with the obtained print job. The non-volatile memory stores a conversion rule in which non-target PJL data that is not supported by the printing device and target PDL data that is supported by the printing device. The computer can perform obtaining the print job via the external interface, in a first case where the PJL data contained in the print job obtained in the obtaining matches the non-target PJL data registered with the conversion rule stored in the non-volatile memory, first converting the PJL data to the target PDL data associated with the non-target PJL data that matches the PJL data in the conversion rule, the printing process using the target PDL that is converted, in the first converting, from the non-target PJL data contained in the print job obtained in the obtaining, and no process according to the PJL data itself that is a target to be matched in the first case.

FIG. 4 shows an example of a print job containing PCLXL data before conversion.

FIG. 6 illustrates an example of conversion rule data.

Figure 1:
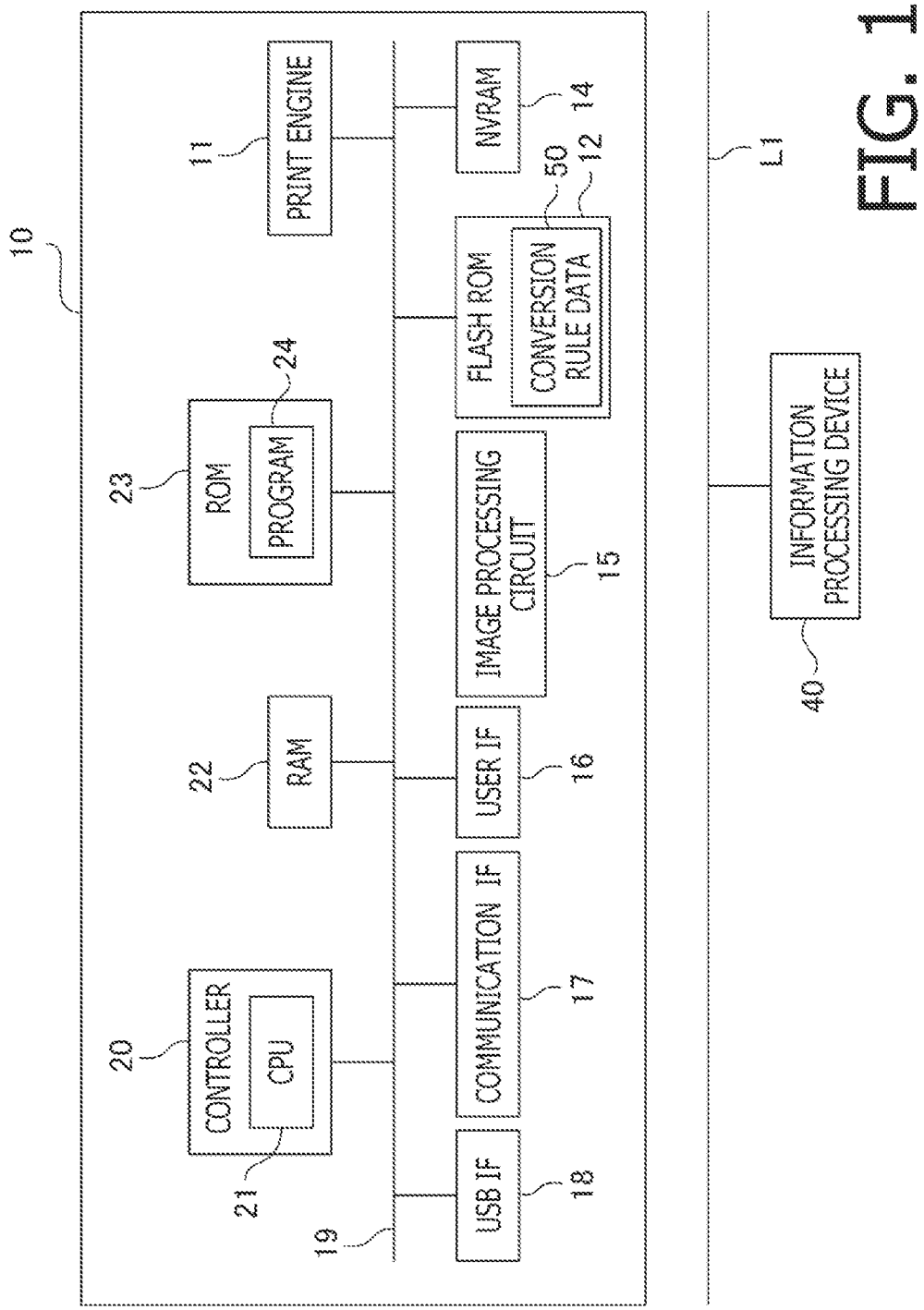
FIG. 1 is a block diagram showing a main electrical configuration of a printing device.

Hereinafter, a printing device, a printing system and a non-transitory computer-readable storage medium according to the present disclosures will be described with reference to the accompanying drawings.

Firstly, referring to FIG. 1, an electrical configuration of a printing device 10 will be described. The printing device 10 has a print engine 11, a flash ROM 12, an NVRAM 14, an image processing circuit 15, a user IF (interface) 16, a communication IF 17, a USB IF 18, a bus 19, a controller 20, a RAM 22, and a ROM 23.

The print engine 11 is an engine for printing an image on a recording medium such as a printing sheet. An electrophotographic method, an inkjet method, a thermal method may be employed as a printing method by the print engine 11. The image processing circuit 15 is configured to apply a RIP (raster image processor) process to image data subjected to a PDL (Page Description Language) part 31b (see FIG. 3) or a PDL part 33b (see FIG. 5) to convert the same to print data. The print data is raster data corresponding to pixels (i.e., dots) to be formed on the recording medium such as the printing sheet. The print data converted from the image data is output to the print engine 11. The NVRAM 14 is a non-volatile memory configured such that information such as print setting information is stored. The user IF 16 is, for example, a touchscreen panel and has functions of displaying messages and receiving user operations. The communication IF 17 is connected to the information processing device 40 via a LAN line L1 so as to mutually communicate with each other. As a communication method between the printing device 10 and the information processing device 40, a communication protocol such as Bluetooth (registered trademark of Bluetooth SIG) may be used. The information processing device 40 is, for example, a PC, a smartphone, and the like. The USB IF 18 is hardware enabling communication with a connected device based on the USB standard.

The controller 20 includes a CPU 21 and the like. The controller 20 is configured to control the print engine 11 in accordance with print setting information stored in the NVRAM 14. Further, the controller 20 is configured to control communication with the information processing device 40 via the communication IF 17. It is noted that the CPU 21, or the controller 20 including the CPU 21 is an example of a computer, and the flash ROM 12 is an example of a non-volatile memory according to the present disclosures. Further, the information processing device 40 is an example of an information processing device, the printing device 10 and the information processing device 40 serve as an example of a printing system according to the present disclosures.

In the ROM 23, a program 24 which causes the CPU 21 to perform a main routine (see FIG. 7) and a subroutine (see FIGS. 8-11) are stored. The RAM 22 has a storage area and a work area. In the storage area, conversion rule data 50 retrieved from the flash ROM 12 is developed. In the work area, the program 24 retrieved from the ROM 23 is developed. The controller 20, the RAM 22, the ROM 23, the flash ROM 12, the NVRAM 14, the print engine 11, the image processing circuit 15, the user IF 16, the communication IF 17, and the USB IF 18 are interconnected through the bus 19. The communication IF 16 and the USB IF 18 are examples of an external interface, and the program 24 is an example of computer-executable instructions according to the present disclosures.

The conversion rule data 50 may be stored in a computer-readable storage medium and may be provided to the printing device 10 from the storage medium. Further, the program 24 may also be stored in the computer-readable storage medium, provided from the storage medium to the printing device 10, and executed by the CPU 21. The computer-readable storage medium is a non-transitory storage medium. The non-transitory storage medium includes storage mediums such as a CD-ROM, a DVD-ROM, and a USB memory. The non-transitory storage medium is also a tangible storage medium. In contrast, an electrical signal carrying a program downloaded from a server on the Internet or the like is a computer-readable signal medium which is a kind of the computer-readable medium, but is not included in the computer-readable storage mediums.

It is noted that processes such as "determine," "analyze," "read," "develop," "write," "convert," "reference," "store," "output," "transmit," "determine," "specify," "obtain," "control," "set," or "incorporate" in the following description represent processing by the CPU 21. The processing by the CPU 21 includes controlling of hardware via an OS (Operating System). It is noted that the term "obtain" is used in the concept that a request is not mandatory. In other words, a process of the CPU 21 to receive data without requesting the same is included in the concept that "the CPU 21 obtains data." Further, a term "data" used in the present disclosures is expressed by computer-readable bit strings. Further, data with the same substantive semantic content but in different formats shall be treated as the same data. The term "information" in the present disclosures is treated in the same manner.

When the model of the printing device connected to the information processing device 40 is changed, even if a printing job is transmitted from the information processing device 40 to the printing device, the printing device may not perform as expected. One reason for such a problem is the compatibility of the PJL data. For example, there may be a case where certain PJL data is supported by a printing device that was connected to the information processing device 40 in the past, but is not supported as the PJL data in the newly connected printing device, but is supported as the PDL data. In such a case, a driver that supports the new PJL data could be installed in the information processing device 40 to control the newly connected printing device.

However, a system administrator who manages the printing system may wish to avoid changing the system program to the greatest extent possible, because such changes may interfere with the normal operation of the system, and because they are labor-intensive. Therefore, the applicant has created a technology that enables the PJL data, which had been transmitted from the information processing device to the printing device, to be converted to the PDL data and used without changing the system program, even if the model of the printing device connected to the information processing device has been changed. Then, in order to use the technology, the printing device 10 in the present embodiment stores the conversion rule data 50 for converting the PJL data to the PDL data in the flash ROM 12 (FIG. 1). The conversion rule data 50 will be described later.

Figure 7:
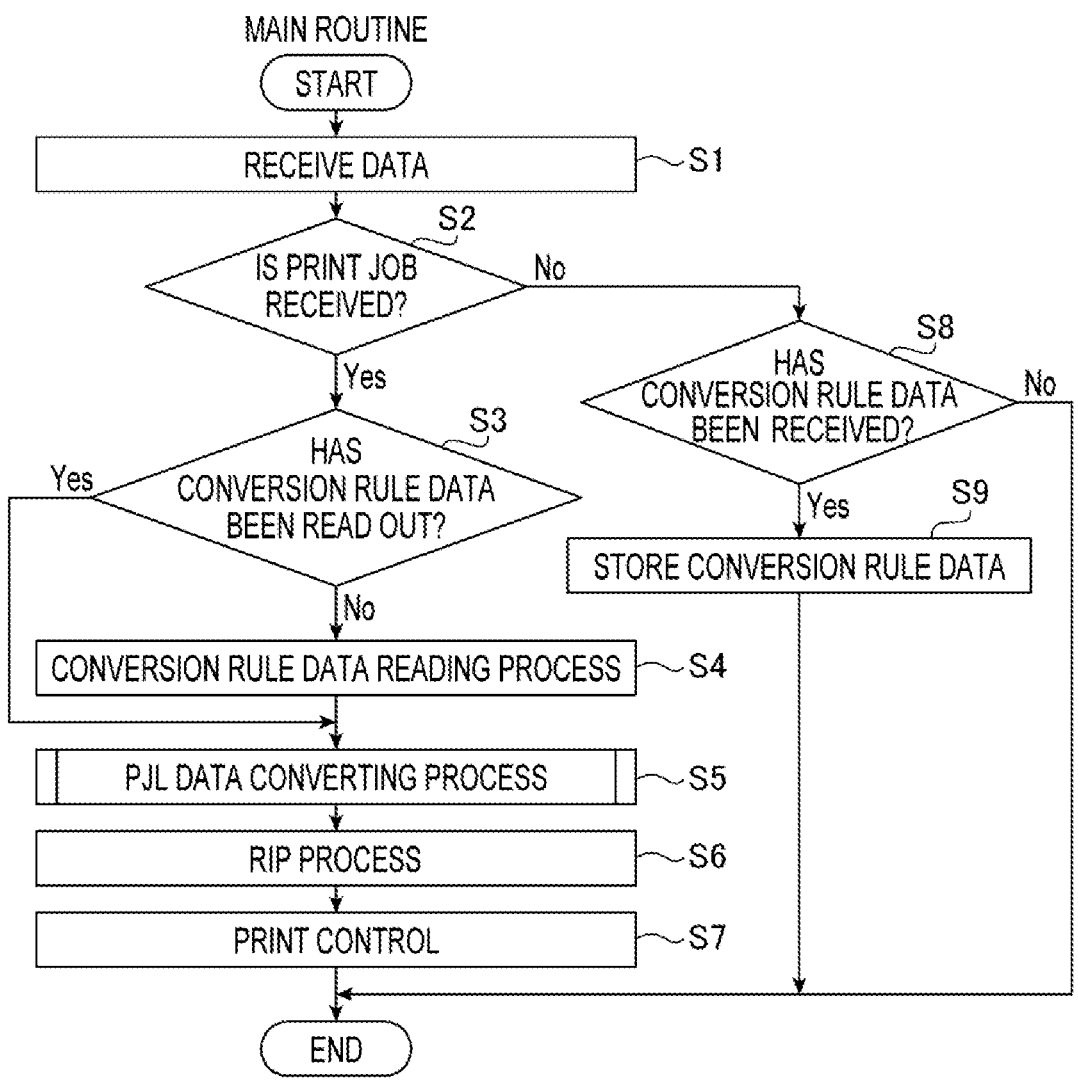
FIG. 7 is a flowchart illustrating a main routine performed by a CPU.

Next, the main routine executed by the CPU 21 of the controller 20 will be described with reference to a flowchart shown in FIG. 7. In the following description, a process that the CPU 21 executes when receiving a print job 30 (FIG. 2) or a print job 32 (FIG. 4) transmitted from the information processing device 40 (FIG. 1) is described. The CPU 21 executes each of the main routine (FIG. 7) and the subroutine (FIGS. 8 to 11) in accordance with the program 24 (FIG. 1) stored in the ROM 23. In the following description, a step number of the process executed by the CPU 21 is abbreviated as S. The PJL data the printing device 10 obtains from the information processing device 40 is referred to as obtained PJL data. The PJL data that matches the obtained PJL data and is registered in the conversion rule data 50 is referred to as the pre-conversion PJL data. The PJL data associated with the pre-conversion PJL data in the conversion rule data 50 is referred to as post-conversion PJL data, and the PDL data associated with the pre-conversion PJL data is referred to as post-conversion PDL data. The post-conversion PJL data and the post-conversion PDL data are data supported by the printing device 10, respectively.

The CPU 21 executes a data receiving process (S1) to receive data transmitted from the information processing device 40 via an external interface (FIG. 1) such as the communication IF 17 and the USB IF 18, and determines whether a print job is received or not (S2). Examples of the print job are indicated in FIGS. 2 and 4. The print job 30 shown in FIG. 2 has a PJL part 30a having at least one PJL data and a PDL part 30b having at least one PDL data. Data D1 "EC %-12345X@PJL" described at the beginning of the print job 30 is an opening command indicating that the PJL part 30a begins from the next line. Each PJL data that constitutes the PJL part 30a represents a name of a creator of the print job 30, the name of the print job 30, print setting information, and the like. The print setting information includes print setting information such as a sheet size, a printing direction, a designation of color or monochrome printing, the number of copies to be printed, and print quality.

For example, the obtained PJL data D2, "@PJL SET MEDIASIZE=LETTER", represents an instruction to set the sheet size to the "LETTER" size. The description on the last line of the PJL part 30a, "@PJL ENTER LANGUAGE=PCL" is the PJL data indicating that the PJL part 30a ends and the PDL part 30b, written in the PCL begins on the next line. PJL data D4 'EC %-12345X@PJL EOJ NAME="office-PDF(A&A4) 1Page.pdf" which is described next to the PDL part 30b is PJL data indicating an end of the print job 30. PJL data D5 "EC %-12345X" described on the next line of the PJL data D4 is PJL data that indicates one delimitation of the 30 print jobs.

The print job 32 shown in FIG. 4 includes a PJL part 32a and a PDL part 32b described in PCLXL. As page description languages, PS (PostScript) may be used in addition to the PCL or PCLXL. The CPU 21 determines that a print job has been received when it is determined that PJL data D1 exists in the received data and data indicating a print job exists after the PJL data D1 (FIG. 7, S2: YES). The data indicating that the job is a print job can be any of the PJL data present in the PJL part 30a (FIG. 2) or the PJL part 32a (FIG. 4). In addition, the CPU 21 may determine that a print job has been received when it is determined that data indicating the PDL data is present in the received data (S2: YES). The data representing PDL data can be either PDL data present in the PDL part 30b (FIG. 2) or in the PDL part 32b (FIG. 4). When the CPU 21 determines that a print job has been received (S2: YES), the CPU 21 determines whether the conversion rule data 50 (FIG. 6) has already been read from the flash ROM 12 (FIG. 1) and developed in the RAM 22 (S3). When the conversion rule data 50 has not already been developed in RAM 22 (S3: NO), the CPU 2 performs a process of reading the conversion rule data 50 from the flash ROM 12 and developing the same in the RAM 22 (S4). Next, the CPU 21 executes the PJL data converting process to convert the obtained PJL data included in the print job received from the information processing device 40 in S1 to post-conversion PJL data or post-conversion PDL data (S5). This PJL data converting process is executed in a subroutine of the main routine (FIG. 8), and the details of the process will be described below.

Then, after executing the PJL data converting process (S5), the CPU 21 executes the RIP process (S6) according to the print job received from the information processing device 40 in S1, and executes print control according to the data generated by the RIP process (S7). The PJL data converting process (S5) is performed based on the conversion rule data 50 (FIG. 6) stored in the flash ROM 12. Since the print control (S7) is executed after the PJL data converting process (S5) is executed, the instructions indicated by the post-conversion PJL data or the post-conversion PDL data converted in the PJL data converting process can be reflected in the print control. In detail, when the post-conversion PJL data or the post-conversion PDL data converted by the PJL data converting process is data indicating a change in the settings of the printing function, the CPU 21 changes the settings of the printing function according to the instructions. Then, the CPU 21 executes the print control based on the changed settings and the PDL part of the print job received in S1 (S7), and terminates the main routine. When the CPU 21 determines that no print job has been received (S2: NO), the CPU 21 determines whether or not the conversion rule data 50 (FIG. 6) has been received (S8). When the PJL data D1 (FIG. 2, FIG. 4) exists in the received data and there is data indicating that the data is the conversion rule data 50 after the PJL data D1, the CPU 21 determines that the conversion rule data 50 has been received (S8: YES). Then the CPU 21 stores the received conversion rule data 50 in the flash ROM 12 (FIG. 1) (S9), and terminates the main routine. Although not shown in FIGS. 2 and 4, the data indicating that the data is the conversion rule data 50 may be the PJL data.

As above, the CPU 21 executed the conversion rule obtaining process (S1) to obtain the conversion rule data 50 via the external interface such as the communication IF 17 and the USB IF 18 (see FIG. 1) and the storing process (S9) to store the conversion rule data 50 obtained in the conversion rule obtaining process in the flash ROM 12. After storing the conversion rule data 50 in the flash ROM 12, the CPU 21 executes the PJL data converting process (FIG. 8) to convert the pre-conversion PJL data to the post-conversion PJL data or the post-conversion PDL data using the stored conversion rule data 50. In this way, after storing the conversion rule data 50 in the flash ROM 12, the CPU 21 can execute the conversion of the obtained PJL data into the post-conversion PJL data or the post-conversion PDL data according to the stored conversion rule data 50, and execute the print control (S7) based on the post-conversion PJL data or the post-conversion PDL data. In other words, by simply executing the simple process of obtaining and storing the conversion rule data 50, the PJL data, which was not supported by the printing device 10 until the conversion rule data 50 was stored, can be made supported by the printing device 10.

When the CPU 21 determines that the conversion rule data 50 has already been read out to the RAM 22 (S3: YES), the CPU 21 executes the PJL data converting process (S5) without executing the process of reading out the conversion rule data 50 (S4). When the CPU 21 determines that the conversion rule data 50 has not been received (S8: NO), the CPU 21 terminates the main routine without executing the process of storing the conversion rule data 50 (S9). The process S1 executed by the CPU 21 is an example of an obtaining process or a conversion rule obtaining process according to the present disclosures. The process S6 is an example of a generation process, the process S7 is an example of a printing process, and the process S9 is an example of a storing process.

Figure 8:
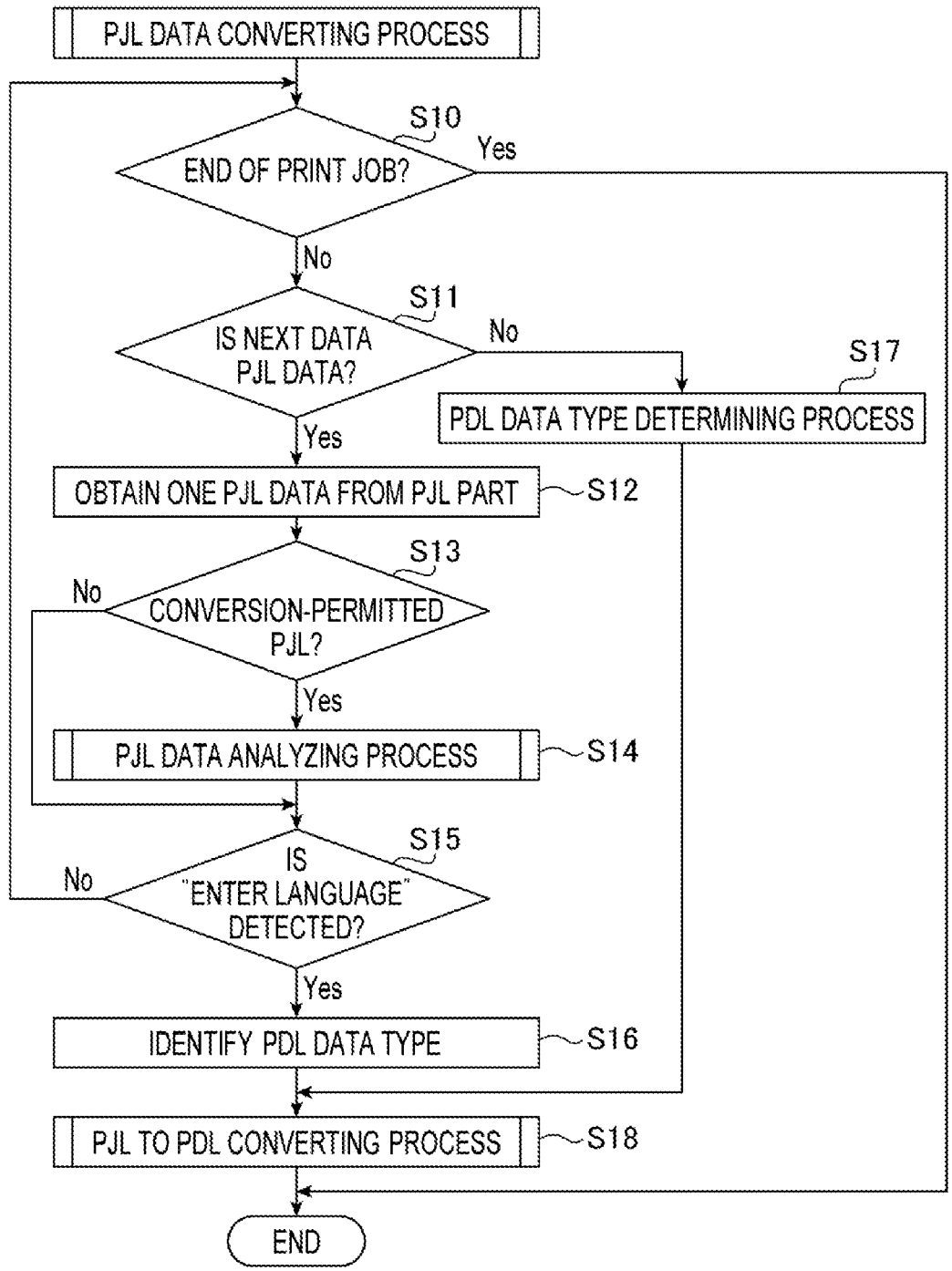
FIG. 8 is a flowchart illustrating a PJL data converting process.

Next, the PJL data converting process executed by the CPU 21 in S5 (FIG. 7) of the main routine is described with reference to FIG. 8. The CPU 21 analyzes the received print job that was received in S1 (FIG. 7) of the main routine, in order from the top to the bottom of the print job. Taking FIG. 2 and FIG. 4 as an example, the CPU 21 analyzes the print job one line at a time, starting with the first line. Then, the CPU 21 determines whether the position which the CPU 21 is analyzing is the end of the print job (S10), and when it is determined that the position is not the end (S10: NO), the CPU 21 determines whether the next data to be analyzed is the PJL data (S11). When the CPU 21 determines that the data is the PJL data (S11: YES), the CPU 21 obtains one PJL data from the PJL parts that constitute the print job (S12). Since the CPU 21 analyzes the PJL data in order starting from the first PJL data, when S12 is executed for the first time, the CPU 21 obtains the first PJL data (S12). Next, the CPU 21 determines whether the PJL data obtained in S12 is the PJL data that is permitted to be converted (S13). A list of the PJL data for which conversion is prohibited is stored in the flash ROM 12, and the CPU 21 permits the conversion when the PJL data obtained in S12 is not included in that list. For example, PJL data instructing the uploading of files stored in the printing device 10 on the network, PJL data instructing the deletion of files, and the like can be included in the list of PJL data that prohibits the conversion. In this way, when the printing device 10 is connected to a network such as the Internet, it is possible to prevent file uploads, file deletions, and the like from occurring due to attacks from malicious parties. In other words, the security of the printing device 10 can be improved.

When the CPU 21 determines that the PJL data is PJL data that is permitted for conversion (S13: YES), the PJL data analyzing process is executed (S14). The PJL data analyzing process is performed in a subroutine (FIG. 9), which is described below. Next, the CPU 21 determines whether or not the PJL data "ENTER LANGUAGE" indicating the end of the PJL part is detected (S15), and when it is determined that the PJL data "ENTER LANGUAGE" is not detected (S15: NO), the CPU 21 returns to S10 and executes S10 to S14. The CPU 21 repeats S10 to S14 until an affirmative decision is made in S15. When it is determined that the PJL data "ENTER LANGUAGE" is detected (S15: YES), a type of the PDL data that constitutes the PDL part is identified (S16). In other words, since the PJL data "ENTER LANGUAGE" indicates the type of the PDL data, the CPU 21 can identify the type of the PDL data by analyzing the detected PDL data "ENTER LANGUAGE" (S16). For example, the last line of the PJL data in the PJL part 30a shown in FIG. 2 is "@PJL ENTER LANGUAGE=PCL", which indicates that the PDL data type is the PCL, so the CPU 21 identifies the PDL data type to be the PCL (S16). Thus, the CPU 21 analyzes the PJL data constituting the PJL part of the obtained print job in the order of arrangement of the PJL data, and executes a type determining process to determine the type of a target PDL data based on the analysis results of the PJL data indicating the type of the PDL data. Therefore, the CPU 21 can determine the type of the PDL data by analyzing the PJL part before analyzing the PDL part. When the CPU 21 determines that the next data is not the PJL data (S11: NO), the CPU 21 executes the PDL data type determining process (S17), executes the PJL to PDL converting process (S18), and then terminates the PJL data analyzing process. In S17, the CPU 21 executes the PDL data type determining process (S17) to determine the type of the post-conversion PDL data by analyzing at least one PDL data that constitutes the PDL part of the obtained print job, for example, the PDL data of the first line. When the print job does not have the PJL part, but only the PDL part, the CPU 21 determines that the next data is not the PJL data (S11: NO). Even when the print job has the PJL and the PDL parts, but does not have the PJL data "ENTER LANGUAGE" at the end of the PDL part, the CPU 21 determines that the next data is not the PJL data (S11: NO).

Next, the CPU 21 executes the PJL to PDL converting process to convert non-target PJL data to target PDL data (S18), and then terminates the PJL data analyzing process. The PJL to PDL converting process in S18 is performed in the subroutine (FIG. 10) described below. When the CPU 21 determines that the PJL data is not PJL data for which conversion is permitted (S13: NO), the CPU 21 executes S15 without executing the PJL data analyzing process (S14) for the PJL data subject to that determination. It is noted that the PDL data type determining process performed in S17 may be rephrased as an auto emulation process. Thus, even when a print job does not have the PJL part and is configured to have only the PDL part, or when the print job has the PJL part but does not have the PJL data "ENTER LANGUAGE", the CPU 21 can determine the type of the post-conversion PDL data. When the CPU 21 determines that the end of the print job is reached (S10: YES), the CPU 21 terminates the PJL data analyzing process. It is noted that the process of S16, which is executed by the CPU 21, is an example of the type identifying process according to the present disclosures.

Figure 9:
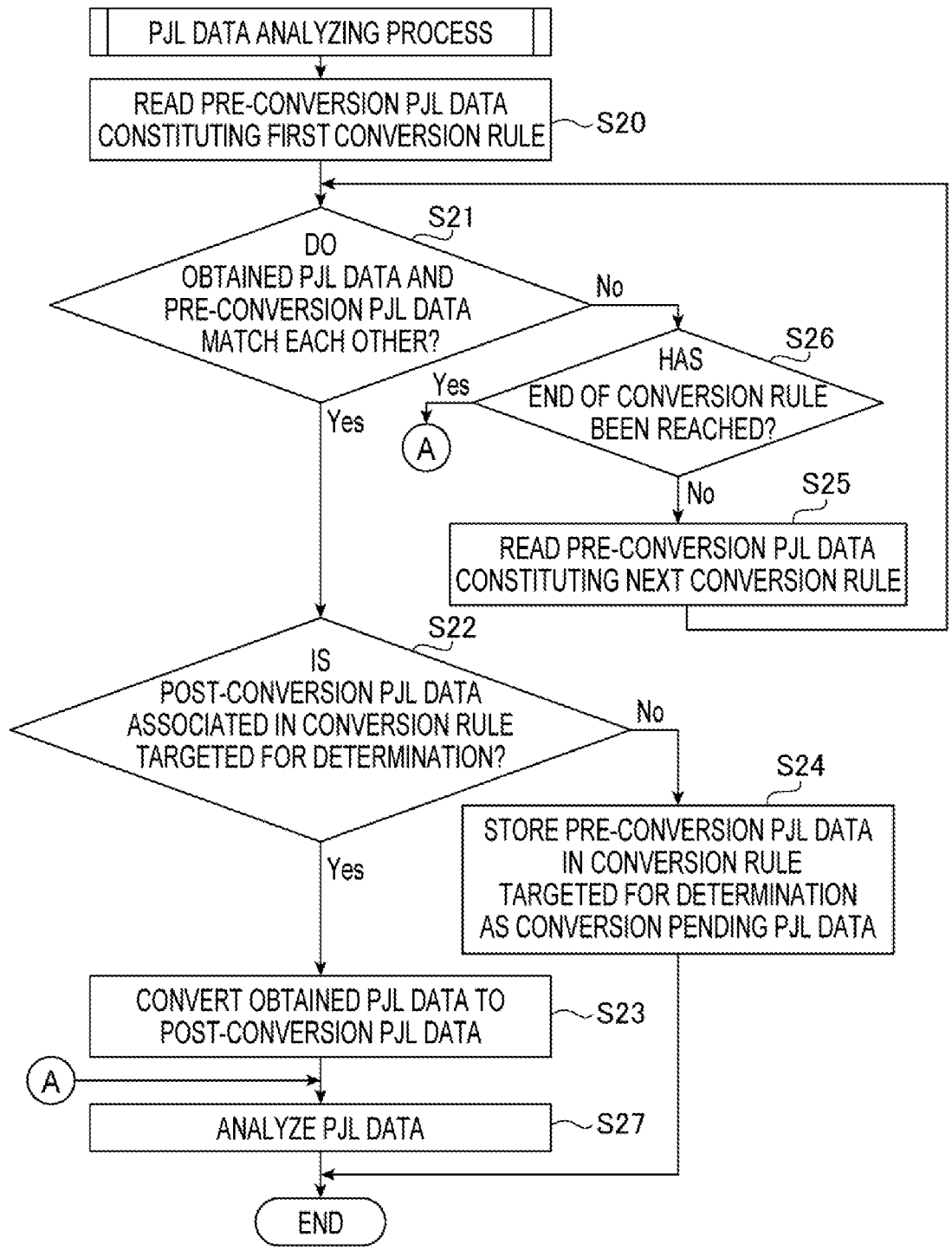
FIG. 9 is a flowchart illustrating a PJL data analyzing process.

Next, the PJL data analyzing process executed by the CPU 21 in S14 (FIG. 8) of the PJL data converting process is described with reference to FIG. 9. The CPU 21 reads the pre-conversion PJL data constituting the first conversion rule, i.e., the conversion rule with conversion rule number 1, from the conversion rule data 50 that has been read from the flash ROM 12 and developed in the RAM 22 (S20). Here, the conversion rule data 50 is described with reference to FIG. 6. The conversion rule data 50 is data for converting obtained PJL data that is not supported by the printing device 10 into post-conversion PJL data or post-conversion PDL data. As shown in FIG. 6, the conversion rule data 50 is composed of 1 to 10 conversion rule numbers, pre-conversion PJL data, post-conversion PJL data, post-conversion PCL data, and post-conversion PCLXL data, which are associated with each other. The post-conversion PCL data and the post-conversion PCLXL data are the post-conversion PDL data, respectively.

Figure 2:
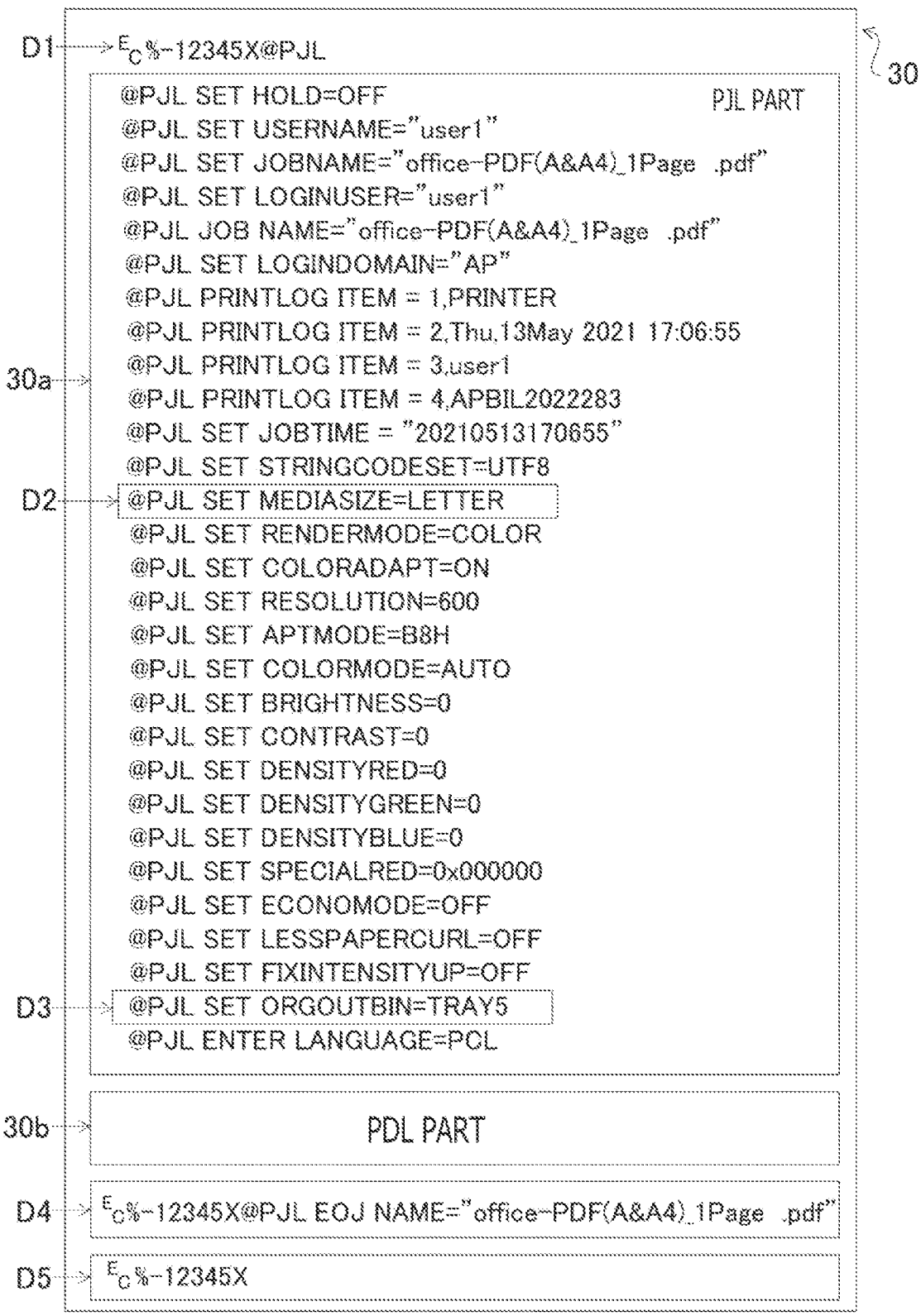
FIG. 2 shows an example of a print job containing PCL data before conversion.
Figure 3:
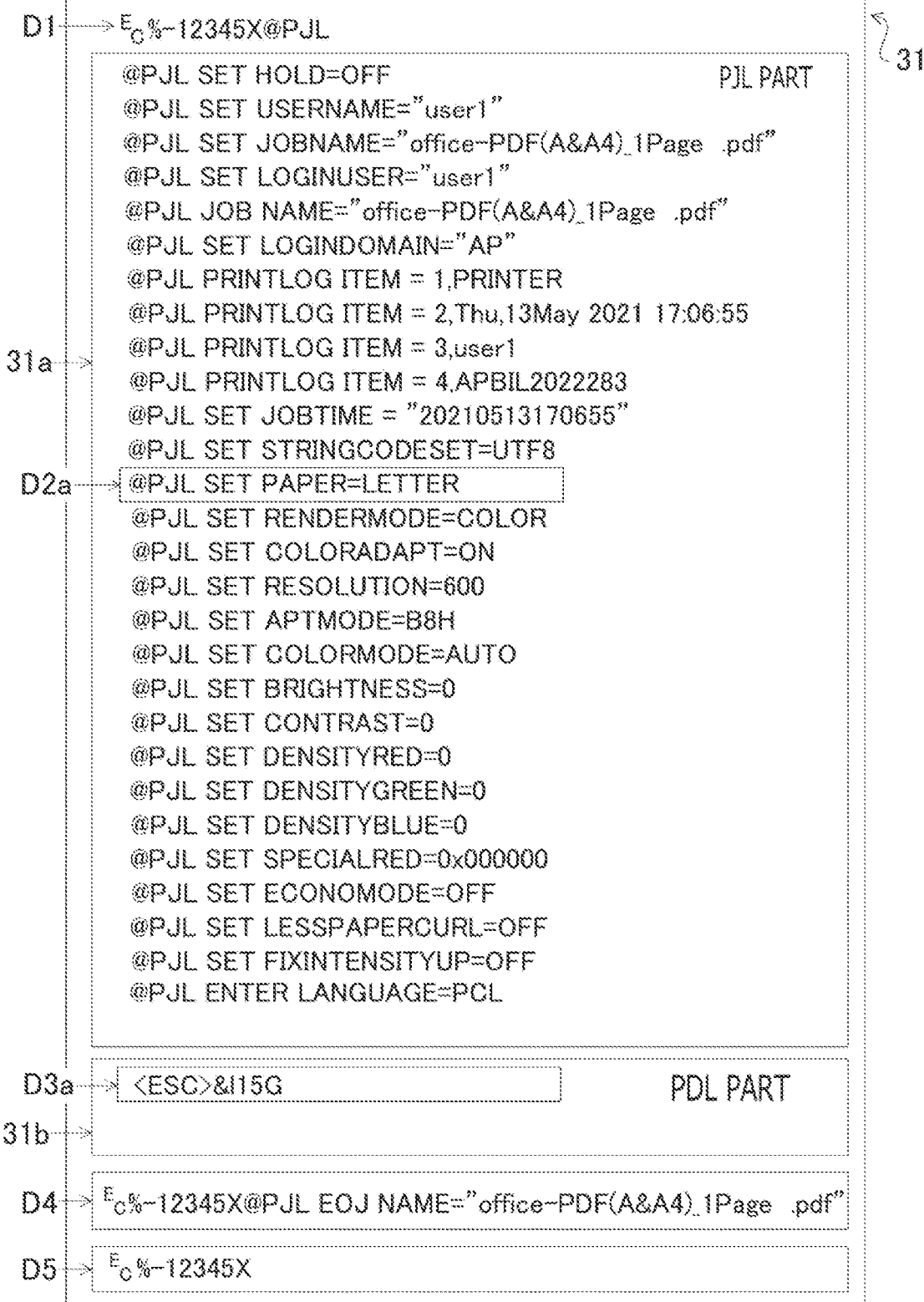
FIG. 3 shows an example of a print job containing PCL data after the conversion.

The CPU 21 determines whether the PJL data obtained in S12 of the PJL data converting process (FIG. 8) and the pre-conversion PJL data read from the conversion rule of conversion rule number 1 in S20 match (S21). If the CPU 21 makes an affirmative determination that the data are matched (S21: YES), the CPU 21 determines whether or not the post-conversion PJL data is associated with the pre-conversion PJL data targeted for determination in S21 in the conversion rule (S22). In other words, the CPU 21 determines whether or not there is any post-conversion PJL data that can be converted from the pre-conversion PJL data in the conversion rule. When the CPU 21 affirmatively determines that the post-conversion PJL data is associated with the pre-conversion PJL data subject to determination in S21 (S22: YES), the CPU 21 converts the obtained PJL data to the post-conversion PJL data associated with the pre-conversion PJL data that matches the obtained PJL data in the conversion rules in S21 (S23) in accordance with the conversion rule that is subject to determination in S21. For example, the acquired PJL data D2 "@PJL SET MEDIASIZE=LETTER", which constitutes the PJL part 30a of the print job 30 shown in FIG. 2, is converted to post-conversion PJL data D2a "@PJL SET PAPER=LETTER" as shown in FIG. 3.

As described above, the CPU 21 obtains a print job via the external interface such as the communication IF 17 and the USB IF 18. Then, the CPU 21 performs a process of converting the obtained PJL data to the post-conversion PJL data associated with the pre-conversion PJL data that matches the obtained PJL data in the conversion rule number 1 when the obtained PJL data included in the obtained print data matches the pre-conversion PJL data registered with the conversion rule data 50 in the flash ROM 12 (i.e., in a first case), and when the pre-conversion PJL data that matches with the obtained PJL data is associated with the post-conversion PJL data in the conversion rule of the conversion rule number 1 (i.e., in a second case) (S20-S23). Therefore, even if the print job obtained from the information processing device 40 includes obtained PJL data that is not supported by the printing device 10, the obtained PJL data can be converted to post-conversion PJL data that is supported by the printing device 10. Accordingly, the administrator of the printing system does not have to install a driver that supports the new PJL data in the information processing device 40, and thus the burden to rebuild the printing system will not be so great.

Next, the CPU 21 analyzes the post-conversion PJL data converted in S23, generates data for executing the RIP process S6 (FIG. 7) according to the results of the analysis (S27), and then terminates the PJL data analyzing process. When the CPU 21 determines that no post-conversion PJL data is associated with the pre-conversion PJL data in the conversion rule selected for determination in S21 (S22: NO), the CPU 21 stores the pre-conversion PJL data in the conversion rule subject to the determination in the RAM 22 (FIG. 1) as conversion pending PJL data (S24) and terminates the PJL data analyzing process. As above, when the CPU 21 determines that no post-conversion PJL data is associated with the pre-conversion PJL data in the conversion rule selected for determination in S21 (S22: NO), the CPU 21 executes a pending process to suspend the conversion of pre-conversion PJL data to post-conversion PDL data until the type of the PDL data is determined in S33 (FIG. 10) of the PJL to PDL converting process to be executed after the PJL data analyzing process. In other words, when there is a conversion rule having the pre-conversion PJL data that matches the obtained PJL data, but the post-conversion PJL data is not associated with the pre-conversion PJL data, the conversion is suspended and temporarily stored in the RAM 22 for the determining process (S32 in FIG. 10) in the PJL to PDL converting process to be executed after the PJL data converting process. In this way, by withholding the conversion until the type of the PDL data is determined, it is possible to avoid erroneous conversion to a different type of post-conversion PDL data. Since the PDL part is located after the PJL part, by determining the type of the PDL data before analyzing the PDL part, the post-conversion PDL data can be incorporated into the PDL part at a correct position according to the type of the PDL data when the post-conversion data is incorporated into the PDL part in the post-conversion data incorporating process (S35 in FIG. 10), which is described later.

When the CPU 21 determines that the PJL data obtained in S12 (FIG. 8) of the PJL data converting process does not match the pre-conversion PJL data read from the conversion rule of conversion rule number 1 in S20 (S21: No), the CPU 21 determines whether the conversion rule with the pre-conversion PJL data read out in S20 is the conversion rule at the end of the 50 conversion rule data, that is, whether or not the end of the conversion rule has been reached (S26). When the CPU 21 determines that the end of the conversion rule has not been reached (S26: No) the conversion PJL data that constitutes the next conversion rule is read from conversion rule data 50 in RAM 22 (S25). Then, the CPU 21 executes S21 to S23 for the read pre-conversion PJL data. When the CPU 21 determines that the end of the conversion rule has been reached (S2 6: Yes), the CPU 21 performs the PJL data analyzing process of the obtained PJL data subject to determination in S21, that is, the PJL data obtained in S12 of the PJL data converting process (FIG. 8), and terminates the PJL data analyzing process. S23 executed by the CPU 21 is an example of the second converting process and S24 is an example of the pending process.

An example of converting the obtained PJL data to the post-conversion PJL data will be described. The conversion rule of conversion rule number 1 is constituted by associating the pre-conversion PJL data "@PJL SET MEDIASIZE=LETTER" with the post-conversion PJL data "@PJL SET PAPER=LETTER". The pre-conversion PJL data "@PJL SET MEDIASIZE=LETTER" and the post-conversion PJL data "@PJL SET PAPER=LETTER" both indicate an instruction to "designate the sheet size as the Letter size". When the obtained PJL data included in the print job 30 (FIG. 2) retrieved from the information processing device 40 matches the pre-conversion PJL data "@PJL SET MEDIASIZE=LETTER", the CPU 21 (FIG. 1) converts the obtained PJL data to the post-conversion PJL data "@PJL SET PATER=LETTER" which is associated with the pre-conversion PJL data "@PJL SET MEDIASIZE=LETTER" that matches the obtained PJL data in the conversion rule of conversion rule number 1. In this way, the CPU 21 can execute the process of "designating the sheet size as the Letter size", which is the instruction indicated by the obtained PJL data, i.e., the pre-conversion PJL data "@PJL SET MEDIASIZE=LETTER".

FIG. 2 shows the print job 30 before conversion according to the conversion rule data 50, and FIG. 3 shows the print job after conversion. The obtained PJL data D2 "@PJL SET PAPER=LETTER" included in the PJL part 30a of the print job 30 shown in FIG. 2 is converted to the post-conversion PJL data D2a "@PJL SET PAPER=LETTER" as shown in FIG. 3. The obtained PJL data D2 before conversion is deleted from the PJL part 31a in FIG. 3. The conversion rule of conversion rule number 8 is configured by associating the pre-conversion PJL data "@PJL SET ORGOUTBIN=TRAY5", the post-conversion PCL data "<ESC>&l5G" and the post-conversion PCLXL data "MediaDestination_UB(5=eExternalBin2". The pre-conversion PJL data "@PJL SET ORGOUTBIN=TRAY5" and the post-conversion PCL data "<ESC>&l5G" both indicate an instruction to "discharge the printed sheet to Tray 5". The post-conversion PCLXL data "MediaDestination_UB (5=eExternalBin2" indicates an instruction to "discharge the printed sheet to external Tray 2". When the obtained PJL data included in the print job 30 obtained from the information processing device 40 matches the pre-conversion PJL data "@PJL SET ORGOUTBIN=TRAY5", and when the type of the page description language of the PDL part constituting the print job 30 is the PCL, the CPU 21 converts the obtained PJL data to the post-conversion PCL data "<ESC>&l5G" that is associated with the pre-conversion PJL data "ORGOUTBIN=TRAY5" which matches the obtained PJL data in the conversion rule of conversion rule number 8. In this way, the CPU 21 can execute "discharge the printed sheet to Tray 5," which is the instruction indicated by the obtained PJL data, i.e., the pre-conversion PJL data "@PJL SET ORGOUTBIN=TRAY5". The obtained PJL data D3 "@PJL SET ORGOUTBIN=TRAY5" included in the PJL part 30a of the print job 30 shown in FIG. 2 has been converted to the post-conversion PCL data D3a "<ESC>&l5G" as shown in FIG. 3. It is noted that the obtained PJL data D3 before conversion has been deleted from the PJL part 31a.

When the obtained PJL data included in the print job 30 obtained from the information processing device 40 matches the pre-conversion PJL data "@PJL SET ORGOUTBIN=TRAY5" and the type of the page description language of the PDL part constituting the print job 30 is the PCLXL, the CPU 21 converts the obtained PJL data to post-conversion PCLXL data "MediaDestination_UB (5=eExternalBin2" which is associated with the pre-conversion PJL data "@PJL SET ORGOUTBIN=TRAY5" that matches the obtained PJL data in the conversion rule of conversion rule number 8. In this way, the CPU 21 can converts the obtained PJL data, i.e., an instruction to "discharge the sheet on which printing is performed onto Tray 5" indicated by the pre-conversion PJL data "@PJL SET ORGOUTBIN=TRAY5" to an instruction "discharge the sheet on which printing has been performed onto external Tray2" indicated by the post-conversion PCLXL data "MediaDestination_UB(5=eExternalBin2F" and execute the same.

Figure 5:
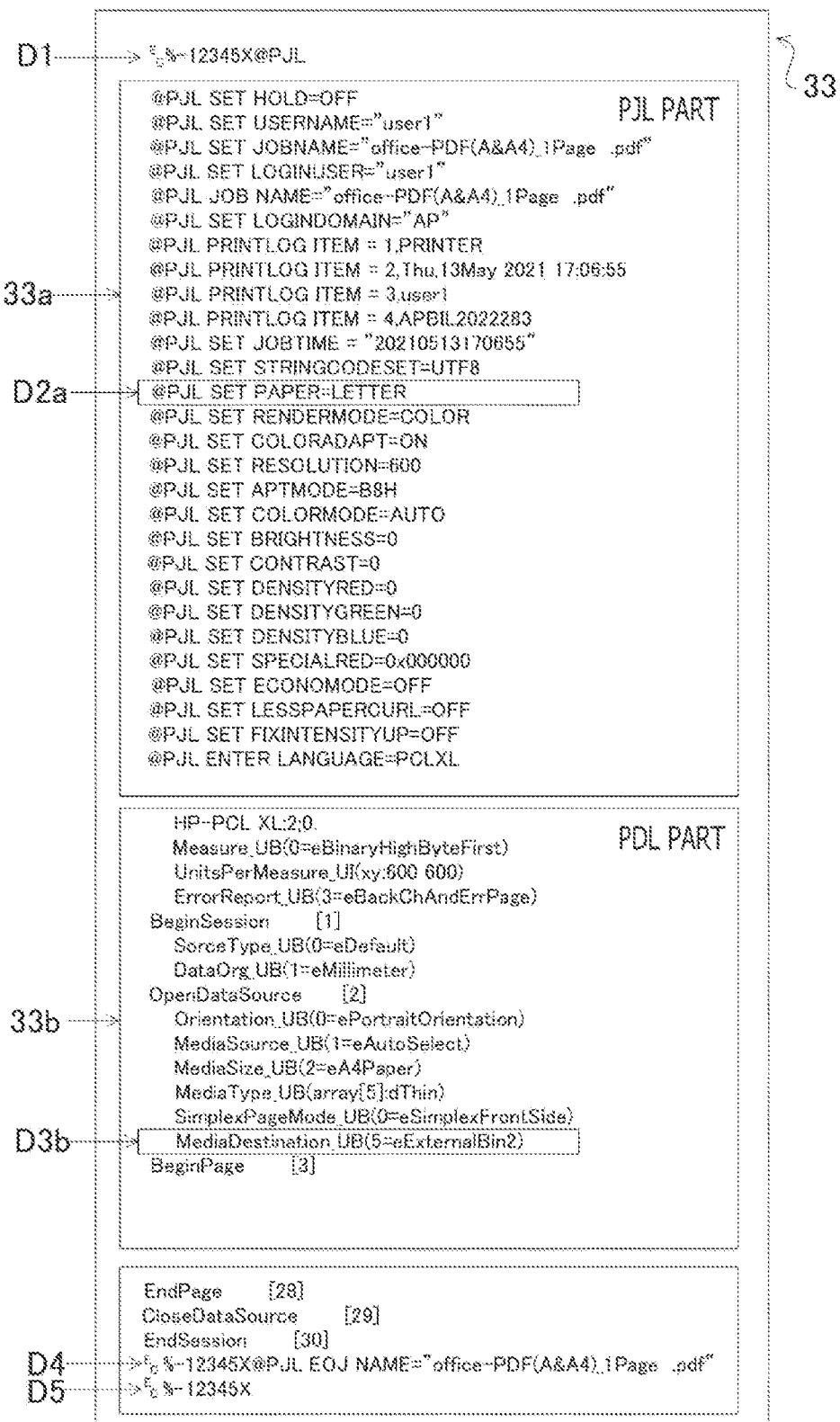
FIG. 5 shows an example of a print job containing PCLXL data after the conversion.

FIG. 4 shows a print job 32 before conversion according to the conversion rule data 50, and FIG. 5 shows a print job 33 after conversion. The obtained PJL data D3 "@PJL SET ORGOUTBIN=TRAY5" included in the PJL part 32a of the print job 32 shown in FIG. 4 is converted to the post-conversion PCLXL data "MediaDestination_UB(5=eExternalBin2", as shown in FIG. 5. It is noted that the obtained PJL data D3 before conversion has been deleted from the PJL part 33a.

The pre-conversion PJL data is an example of non-target PJL data according to the present disclosures. The post-conversion PJL data is an example of the target PJL data according to the present disclosures, and the post-conversion PCL data and post-conversion PCLXL data are examples of subject PDL data according to the present disclosures. The PJL part 30a (FIG. 2), the PJL part 31a (FIG. 3), the PJL part 32a (FIG. 4), and the PJL part 33a (FIG. 5) are each an example of a PJL part according to the present disclosures. The PDL part 30b (FIG. 2), the PDL part 31b (FIG. 3), the PDL part 32b (FIG. 4), and the PDL part 33b (FIG. 5) are each an example of a PDL part according to the present disclosures.

Figure 10:
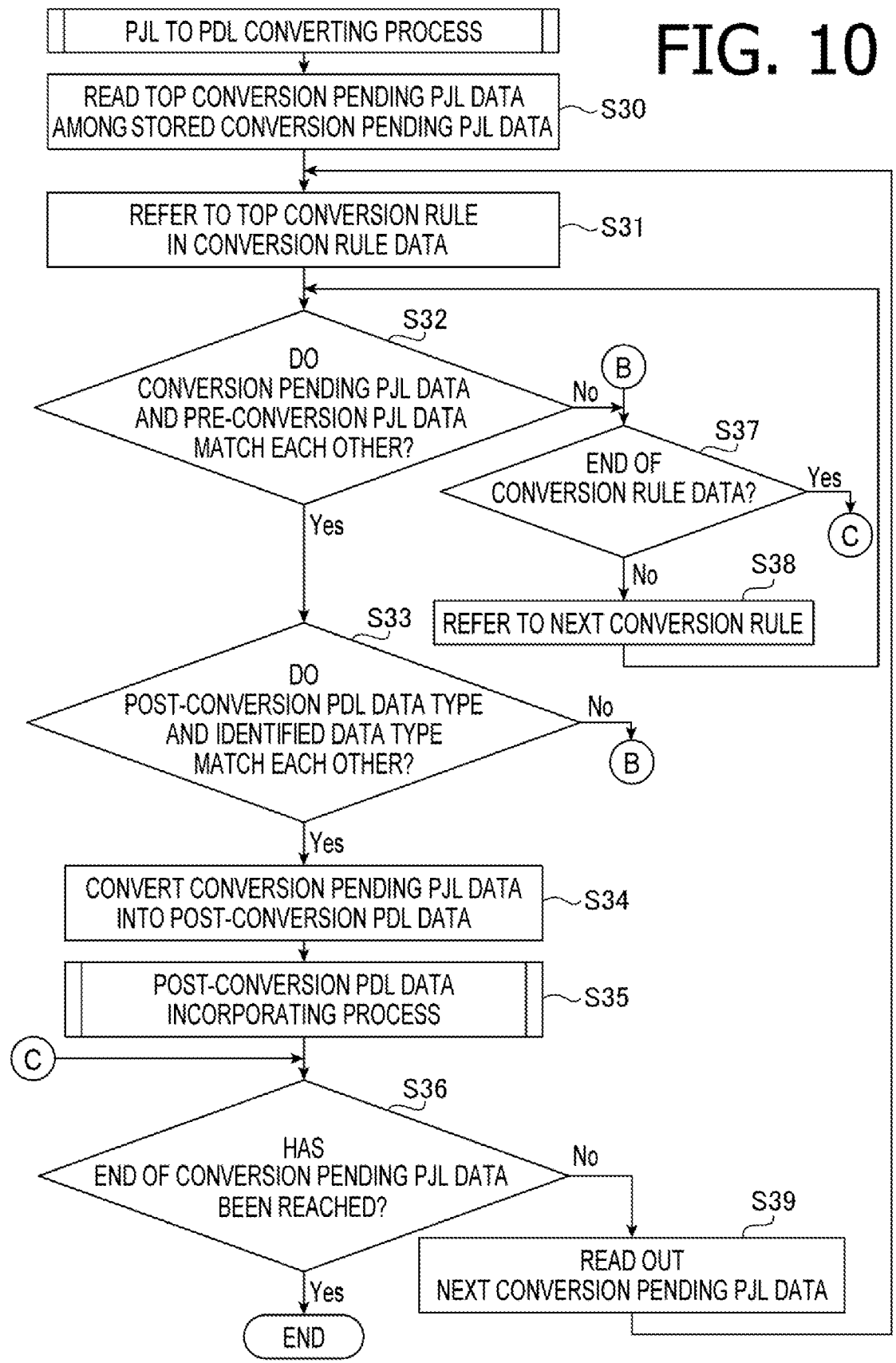
FIG. 10 is a flowchart illustrating a PJL to PDL converting process.

Next, the PJL to PDL converting process executed by CPU 21 in S18 of the PJL data converting process (FIG. 8) is described with reference to FIG. 10. The CPU 21 reads (S30) the top conversion pending PJL data among the conversion pending PJL data temporarily stored in the RAM 22 in S23 (FIG. 9) of the PJL data analyzing process, and refers to the top conversion rule in the conversion rule data 50 (S31) and determines whether the conversion pending PJL data read from the RAM 22 in S30 matches the pre-conversion PJL data in the conversion rule referred to in S31 (S32). Here, when the CPU 21 affirmatively determines that they match (S32: YES), the CPU 21 determines whether the type of the post-conversion PDL data associated with the pre-conversion PJL data subject to the determination in S32 in the conversion rule referenced in the determination in S32 matches the type of the PDL data identified in S16 (FIG. 8) of the PJL data converting process (S33). When the CPU 21 affirmatively determines that the data matches (S33: YES), the CPU 21 converts the conversion pending PJL data that was subject to the affirmative determination in S32 into the post-conversion PDL data that was subject to the affirmative determination in S33 (S34). For example, the CPU 21 converts the obtained PJL data D3 "@PJL SET ORGOUTBIN=TRAY5" shown in FIG. 2 into the post-conversion PCL data D3a "<ESC>&115G" as shown in FIG. 3.

The CPU 21 stores the post-conversion PDL data converted in S34 in RAM 22 for use in the post-conversion PDL data incorporating process described below (S34). Next, the CPU 21 executes the post-conversion PDL data incorporating process (FIG. 11), which will be described later (S35). Then, the CPU 21 determines (S36) whether the conversion pending PJL data read from the RAM 22 in S30 is the conversion pending PJL data at the end of the conversion pending PJL data stored in the RAM 22, that is, whether the end of the conversion pending PJL data has been reached. When it is negatively determined that the end has not been reached (S36: NO), the CPU 21 reads the next conversion pending PJL data from the RAM 22 (S37), executes S31 to S36, converts the conversion pending PJL data to the post-conversion PDL data (S34), and executes the post-conversion PDL data incorporating process (S35). When the CPU 21 determines negatively that the conversion pending PJL data read from the RAM 22 does not match the pre-conversion PJL data of the conversion rule referred to in S31 (S32: NO), the CPU 21 determines whether the conversion rule referred to in S31 is the conversion rule at the end of the conversion rule data 50 (S37), and when it is determined negatively that the conversion rule referred to in S31 is not the end of the conversion rule (S37: NO), the CPU 21 refers to the next conversion rule (S38) and executes S32.

That is, the CPU 21 refers to all conversion rules registered in the conversion rule data 50 until the CPU 21 makes an affirmative decision (S32: YES) that the conversion pending PJL data read from the RAM 22 and the pre-conversion PJL data of the conversion rule referred to in S31 match. When the CPU 21 made a negative determination in S33 (S33: NO), the CPU 21 determines whether or not the end of the conversion rule is reached (S37). Here, when the CPU 21 makes an affirmative decision that the end of the conversion rule is reached (S37: YES), the CPU 21 determines whether the end of the conversion pending PJL data has been reached (S36). When the CPU 21 makes a negative determination that the end of the conversion pending PJL data has not been reached (S36: NO), the next conversion pending PJL data is read from the RAM 22 (S39). That is, the CPU 21 refers to all the conversion rules for each of the conversion pending PJL data stored in the RAM 22, when the CPU 21 determines that the conversion pending PJL data read out from the RAM 22 matches the pre-conversion PJL data of the conversion rule referred to in S31 (S32: YES), and when the CPU 21 determines that the type of the post-conversion PDL data, which is associated in the conversion rule referred to in S32, and the type of the PDL data identified in S16 (FIG. 8) of the PJL data converting process match (S33: YES), the CPU 21 execute conversion of the conversion pending PJL data to the post-conversion PDL data (S34) and the post-conversion PDL data incorporating process (S35).

As described above, the CPU 21 execute the obtaining process (S1 of FIG. 7) to obtain the print job via the external interface such as the communication IF 17 and the USB IF 18 (FIG. 1). When the obtained PJL data included in the print job obtained in the obtaining process matches the pre-conversion PJL data registered with the conversion rule data 50 (see FIG. 6) of the flash ROM 12 (FIG. 1), the CPU 21 executes the converting process (S34) to convert the obtained PJL data into the post-conversion PDL data that is associated with the pre-conversion PJL data that matches the obtained PJL data in the conversion rule data 50. Then, the CPU 21 executes the print control (S7 in FIG. 7) using the obtained PJL data included in the print job obtained by the obtaining process and the post-conversion PDL data converted by the converting process, while not executing the process according to the PJL data itself that was subject to the affirmative determination to match in the determination in S32. The PJL to PDL converting process executed by the CPU 21 is an example of a first converting process according to the present disclosures.

Figure 11:
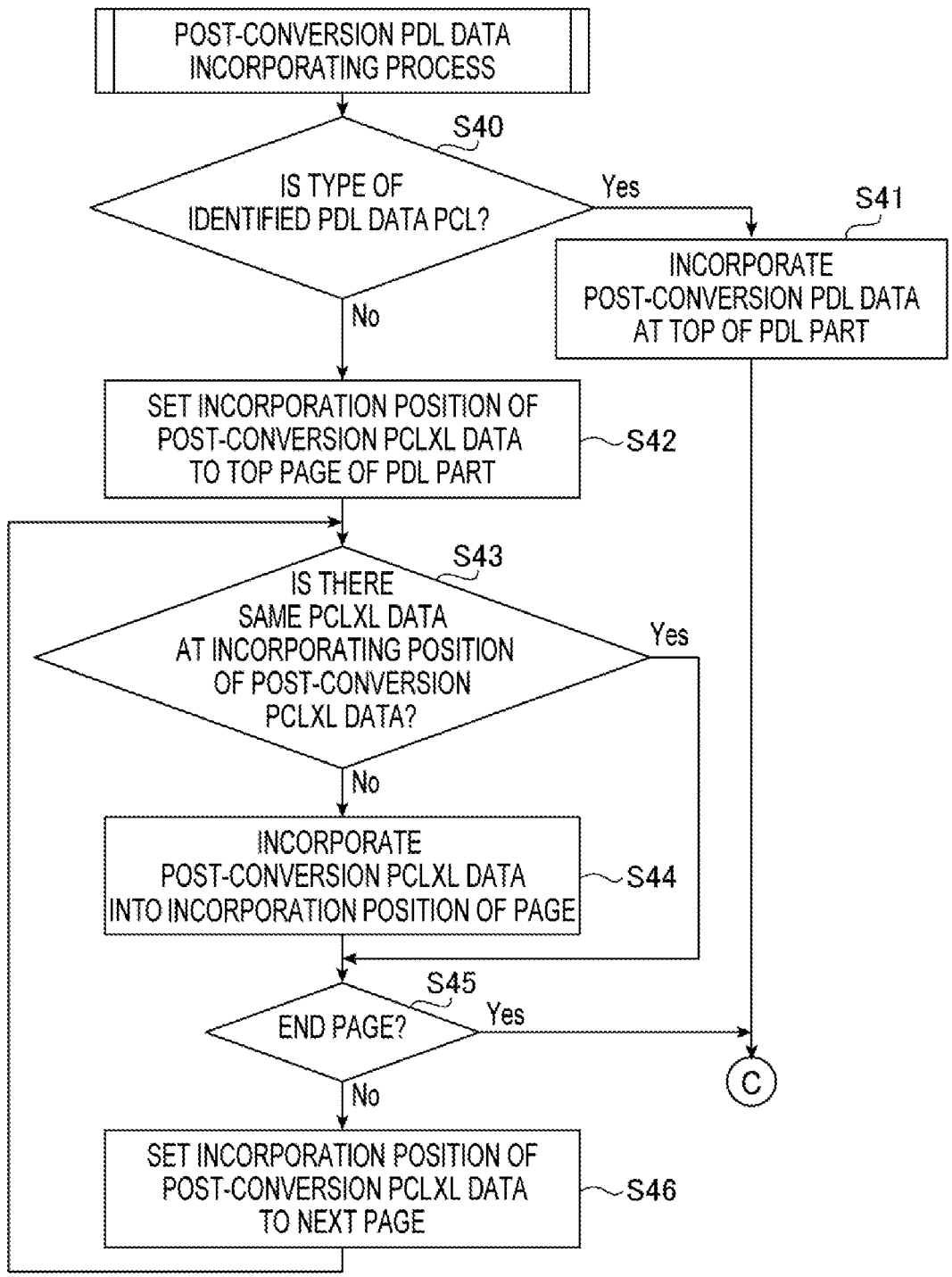
FIG. 11 is a flowchart illustrating a data incorporating process to incorporate post-conversion PDL data.

Next, the post-conversion PDL data incorporating process performed by the CPU 21 in S35 (FIG. 10) of the PJL to PDL converting process will be described with reference to FIG. 11. When the PDL part is composed of the PCL data, newly added PCL data must be incorporated into at the beginning of the PDL part according to the PCL standard, therefore, the post-conversion PCL data is incorporated into the beginning of the PDL part 31b, as shown in FIG. 3. Moreover, according to the PCL standard, when the PDL part is composed of the PCL data, each instruction by each PCL data arranged on the first page is succeeded to the second and subsequent pages. For example, when the post-conversion PCL data D3a "<ESC>&115G" is incorporated at the beginning of the first page, the instruction to "discharge the printed paper to Tray 5" indicated by the post-conversion PCL data D3a is succeeded on the second and subsequent pages.

The CPU 21 determines whether the type of the PDL data identified in S16 of the PJL data converting process is the PCL (S40), and when it is determined that the type is the PCL (S40: YES), the post-conversion PDL data stored in the RAM 22 in S34 (FIG. 10) of the PJL to PDL converting process is incorporated at the beginning of the PDL part (S41). That is, when the type of the post-conversion PDL data is the PCL, the post-conversion PDL data can be incorporated at the beginning of the PDL part so that the instructions indicated by the incorporated post-conversion PDL data will be succeeded on the next and subsequent pages. For example, post-conversion PCL data D3a "<ESC>&115G" is incorporated at the beginning of the PDL part 31b, as shown in FIG. 3. Then, the CPU 21 executes S36 (FIG. 10) of the PJL to PDL converting process, and when it is determined that the end of the conversion pending PJL data has not been reached (S36: NO), the CPU 21 executes S37, executes the conversion of the conversion pending PJL data to the post-conversion PDL data, and executes that post-conversion PDL data incorporating process (S35). In other words, the CPU 21 executes the conversion of the conversion pending PJL data to the post-conversion PDL data and the incorporating process of the post-conversion PDL data into the PDL part for each conversion pending PJL data stored in the RAM 22.

According to the PDL standard, when multiple pieces of PDL data are arranged in the PDL part, the PDL data arranged later in the analysis order is given priority. For example, when PDL data indicating an instruction to "discharge the printed sheet to Tray 5" is arranged in the PDL part, and PDL data indicating an instruction to "discharge the printed sheet to Tray 1" is arranged afterward, the instruction to "discharge the printed sheet to Tray 5" is not executed because the PDL data arranged later has priority over the PDL data, and the instruction to "discharge the printed sheet to Tray 1" is executed. Since this instruction is succeeded on the next page and thereafter, the sheets on the next page and thereafter are also ejected onto Tray 1. When the CPU 21 determines that the type of the PDL data identified in S16 (FIG. 8) of the PJL data converting process is not the PCL, that is, the type is the PCLXL (S40: NO), the CPU 21 sets the incorporation position of the post-conversion PDL data, that is, the post-conversion PCLXL data, to the top page of the PDL part (S42). The incorporation position of the post-conversion PCLXL data is defined by the PCLXL standard and is set to a defined position in the PCLXL data group that has the same attributes as those of the post-conversion PCLXL data (S42). In the example shown in FIG. 5, the PCLXL data group with the same attributes, PCLXL data "Orientation_UB(0=ePortraitOrientation)" to PCLXL data "SimplexPageMode_UB(0=eSimplexFrontSide)" is placed in the PCLXL data "BeginPage [3]" which constitutes the PDL part 33*b*. In the example in FIG. 5, the next line of the PCLXL data "SimplexPageMode_UB(0=eSimplexFrontSide)" is set to the defined position for incorporating the post-conversion PCLXL data D3*b*.

Next, the CPU 21 determines whether or not the PDL data corresponding to the same setting item exists at the incorporation position of the post-conversion PCLXL data set in S42 (S43). When it is determined that there is no PDL data at the incorporation position (S43: NO), the post-conversion PDL data is incorporated into the incorporation position set in S42 (S44). For example, as shown in FIG. 5, the post-conversion PCLXL data D3*b* "MediaDestination_UB(5=eExternalBin2)" is incorporated into the next line of the PCLXL data "SimplexPageMode_UB(0=eSimplexFrontSide)". Data "SimplexPageMode_UB" is the PCLXL data corresponding to the setting item of printing surface, and data "Orientation_UB" is the PCLXL data corresponding to the setting item of printing orientation.

Next, the CPU 21 determines whether or not the current page is the end page (S45). When it is determined that the current page is not the end page (S45: NO), the incorporation position of the post-conversion PCLXL data is set to the next page of the PDL part (S46). That is, when the type of the post-conversion PDL data is PCLXL, the post-conversion PCLXL data must be incorporated into each page of the PDL part, and therefore the incorporation position of the post-conversion PCLXL data is set to the next page of the PDL part (S46). Then, the CPU 21 executes S43 and S44, and when it is determined that the current page is the end page (S45: YES), the CPU 21 executes S36 (FIG. 10) of the PJL to PDL converting process, and when it is determined that the end of the conversion pending PJL data has not been reached (S36: NO), the CPU 21 executes S37, executes conversion of the conversion pending PJL data to the post-conversion PDL data (S34), and executes the post-conversion PDL data incorporating process (S35).

In other words, the print job is configured to include multiple pages of page-by-page PDL parts. The incorporation position for incorporating the post-conversion PCLXL data converted from the PJL data by the converting process in S34 (FIG. 10) into the PDL part is defined by the PCLXL data standard. When there is no PCLXL data of the same setting item as the target PCLXL data in the defined incorporation position (S43: NO), the CPU 21 incorporates the post-conversion PCLXL data converted from the PJL data by the converting process of S34 into the defined incorporation position of the PDL part when analyzing the PDL part for each page. Furthermore, when the PCLXL data of the same setting item as the post-conversion PCLXL data exists in the incorporation position (S43: YES), the CPU 21 does not incorporate the post-conversion PCLXL data converted from the PJL data by the converting process of S34 in the defined incorporation position of the PDL part when analyzing the PDL part on a page-by-page basis.

As described above, the CPU 21 can incorporate the post-conversion PCLXL data into the defined position of the PDL part according to the PCLXL data standard. In addition, the CPU 21 can perform printing according to the print job instructions by performing the RIP process in S6 for the PCLXL data that is supported by the printing device 10. The incorporating process executed by the CPU 21 is an example of an incorporating process according to the present disclosures.

By executing the incorporating process described above, a print job in which the post-conversion PDL data is incorporated into the PDL part is completed. The CPU 21 executes the RIP process for that print job (S6 in FIG. 7), and executes print control according to the data generated by the RIP process (S7). When the CPU 21 executes a process of incorporating the post-conversion PDL data into the PDL part by the incorporating process, the obtained PJL data that matches the pre-conversion PJL data subject to the affirmative determination in S32 (FIG. 10) of the PJL to PDL converting process is deleted from the PJL part, and therefore, the process according to the obtained PJL data itself is not executed. It is not mandatory to delete from the PJL part the obtained PJL data that matches the pre-conversion PJL data subject to the determination in the case of the affirmative determination in S32 (FIG. 10) of the PJL to PDL converting process. This is because the PDL standard gives priority to the PDL data over the PJL data.

In a case where the post-conversion PJL data indicating the same instruction contents as the post-conversion PDL data exists, when the post-conversion PDL data is arranged in the PDL part that exists later than the PJL part, the instruction contents indicated by the post-conversion PDL data arranged in the PDL part take priority over the PDL data. For example, In a case where post-conversion PJL data indicating the instruction to "discharge printed sheet to Tray 5" exists in the PJL part, when the post-conversion PDL data indicating the instruction to "discharge printed sheet to Tray 1" is arranged in the PDL part, the instruction to "discharge printed sheet to Tray 5" indicated by the post-conversion PJL data is not executed, but the instruction to "discharge printed sheet to Tray 1" indicated by the post-conversion PDL data is executed. By the incorporating process described above, a print job in which the post-conversion PDL data is incorporated into the PDL part is completed. Then, the CPU 21 can perform the RIP process (S6) and the print control (S7) according to that completed (i.e., resulting) print job.

In other words, according to the printing device 10 described above, even if a print job obtained from the information processing device 40 via the communication IF 17 or the USB IF 18 includes PJL data that the printing device 10 does not support, the PJL data can be converted to the PJL or the PDL data that the printing device 10 supports, thereby enabling printing in accordance with the print job obtained from the information processing device 40. The CPU 21 applies the RIP process (S5 in FIG. 7) to the print job with the post-conversion PJL data converted in S23 of the PJL data analyzing process described above, and executes the print control according to the RIP-processed data (S7). In addition, the CPU 21 does not perform processes according to the pre-conversion PJL data itself. The post-conversion PCL data or the post-conversion PCLXL data is an example of post-conversion PDL data.

As described above, the printing device 10 is equipped with the communication IF 17, the USB IF 18, the flash ROM 12, and the CPU 21. The CPU 21 obtains print jobs (30, 32) with the PJL and PDL data via the communication IF 17 or the USB IF 18. The printing device 10 executes the print control (S7) according to the obtained print job. In the flash ROM 12, the conversion rule data 50, in which the pre-conversion PJL data and the post-conversion PDL data are associated with each other, is stored. The CPU 21 is configured to execute the obtaining process (S1) to obtain the print job via the communication IF 17 or the USB IF 18, and the first converting process (S34) to convert the obtained PJL data included in the print job obtained by the obtaining process to the post-conversion PDL data associated with the pre-conversion PJL data that matches the obtained PJL data in the conversion rule data 50 in a first case where the obtained PJL data matches the pre-conversion PJL data registered with the conversion rule data 50 stored in the flash ROM 12. The CPU 21 is configured to perform the print control (S7) using the post-conversion PDL data that is converted from the pre-conversion PJL data in the first converting process (i.e., from the PDL data obtained in the obtaining process). The CPU 21 does not perform a process according to the obtained PJL data itself, which was the target of matching in the first case. The post-conversion PCL data and post-conversion PCLXL data are examples of post-conversion PDL data.

As described above, according to the printing device, printing system (10, 40) and a non-transitory computer-readable storage medium described above, when the printing device is updated, even if a print job obtained from the information processing device 40 includes obtained PJL data which is not supported by the updated printing device, the obtained PJL data can be converted to the post-conversion PDL data containing the instruction that is indicated by the obtained PJL data and suitably supported by the updated printing device. Then, with use of the post-conversion PDL data, the print control can be performed. Therefore, the printing device, a printing system (10, 40) and a non-transitory computer-readable storage medium that do not increase the burden to reconstruct the printing system even when the printing device is updated can be provided.

MODIFICTAIONS

Although in the embodiment described above, a process for a print job in which the PDL part is composed of the PCL data or the PCLXL data is described, the technology disclosed herein can be applied to a print job in which the PDL part is composed of the PDL data other than PCL data or the PCLXL data, for example, PS data.

What is claimed is:
1. A printing device, comprising:
an external interface;
a non-volatile memory; and
a computer configured to:
obtain a print job containing PJL data and PDL data via the external interface; and
perform a printing process in accordance with the obtained print job,
wherein the non-volatile memory stores a conversion rule in which non-target PJL data that is not supported by the printing device and target PDL data that is supported by the printing device, and
wherein the computer is configured to perform:
obtaining the print job via the external interface;
in a first case where the PJL data contained in the print job obtained in the obtaining matches the non-target PJL data registered with the conversion rule stored in the non-volatile memory, first converting the PJL data to the target PDL data associated with the non-target PJL data that matches the PJL data in the conversion rule;
the printing process using the target PDL that is converted, in the first converting, from the non-target PJL data contained in the print job obtained in the obtaining; and
no process according to the PJL data itself that is a target to be matched in the first case.
2. The printing device according to claim 1,
wherein the conversion rule is further associated with the non-target PJL data and target PJL data supported by the printing device,
wherein the computer is configured to perform:
in the first case, and in a second case where the non-target PJL data, that matches the PJL data, is associated with the target PJL data in the conversion rule, second converting the PJL data to the target PJL data associated with non-target PJL data that matches, in the conversion rule, with the PJL data;
the printing process using the target PJL data that is converted, in the second converting, from non-target PJL data contained in the print job obtained in the obtaining; and
no process according to the PJL data itself that is a target to be matched in the second case.
3. The printing device according to claim 2,
wherein the print job is configured such that a PDL part constituted by at least one piece of PDL data is arranged after a PJL part constituted by at least one piece of PJL data,
wherein the computer is configured to perform:
analyzing PJL data constituting the PJL part of the print job obtained in the obtaining, the PDL data being analyzed in an order of arrangement of the PJL data;
identifying a type of the target PDL data targeted to be supported by the printing device based on an analyzing result of the PJL data indicating a type of the PDL data;
generating data for printing based on the type identified in the identifying and PDL data constituting the PDL part;
the printing in accordance with the data generated in the generating; and
when the target PJL data is not associated, in the conversion rule, with the non-target PJL data that matches the PJL data targeted to match in the first case, pending to hold conversion to target PDL data of the PJL data by the first converting until the type is identified in the identifying the type,
in the first converting:
after the type of the target PDL data is identified in the identifying the type, when the PJL data that the conversion is held in the pending matches the non-target PJL data registered with the conversion rule stored in the non-volatile memory, and the type of target PDL data associated with the non-target PJL data matches a type identified in the identifying the type, converting the PJL data targeted for matching to the target PDL data, the target PDL data being associated with the non-target PJL data that matches the PJL data in the conversion rule;

incorporating the target PDL data converted from the PJL data in the first converting into the PDL part;

the printing process using the PDL part containing the PDL data incorporated in the PDL in the incorporating; and no process according to the PJL data itself that is a target to be matched in the first converting.

4. The printing device according to claim 2, wherein the print job is configured such that a PDL part constituted by at least one piece of PDL data is arranged after a PJL part constituted by at least one piece of PJL data, wherein the computer is configured to perform:

analyzing PDL data constituting the PDL part of the print job obtained in the obtaining;

identifying a type of the target PDL data targeted to be supported by the printing device based on an analyzing result of the PDL data;

generating data for printing based on the type identified in the identifying and PDL data constituting the PDL part;

the printing in accordance with the data generated in the generating; and when the target PJL data is not associated, in the conversion rule, with non-target PJL data that matches the PJL data targeted to match in the first case, pending to hold conversion to target PDL data of the PJL data by the first converting until the type is identified in the identifying the type, in the first converting:

after the type of the target PDL data is identified in the identifying the type, when the PJL data that the conversion is held in the pending matches the non-target PJL data registered with the conversion rule stored in the non-volatile memory, and the type of target PDL data associated with the non-target PJL data matches a type identified in the identifying the type, converting the PJL data targeted for matching to the target PDL data, the target PDL data being associated with the non-target PJL data that matches the PJL data in the conversion rule;

incorporating the target PDL data converted from the PJL data in the first converting into the PDL part;

the printing process using the PDL part containing the PDL data incorporated in the PDL in the incorporating; and no process according to the PJL data itself that is target to be matched in the first converting.

5. The printing device according to claim 3, wherein the computer is configured to incorporate the target PDL data converted in the first converting at a top of the PDL part.

6. The printing device according to claim 3, wherein the print job is configured to contain page-by-page basis PDL part for multiple pages, wherein an incorporating position at which target PDL data converted from the PJL data in the first converting into the PDL part is defined by a PDL data standard, wherein the computer is configured to perform, in the incorporating:

when PDL data having same setting items as the target PDL data does not exist at the incorporating position, incorporating the target PDL data converted from the PJL data in the first converting at the incorporating position when analyzing the PDL part for each page; and when PDL data having the same setting items as the target PDL data exists at the incorporating position, not incorporating the target PDL data converted from the PJL data in the first converting at the incorporating position when analyzing the PDL part for each page.

7. The printing device according to claim 1, wherein the computer is configured to perform:

obtaining the conversion rule via the external interface;

storing the conversion rule obtained in the obtaining in the non-volatile memory; and after storing the conversion rule in the storing, the first converting using the conversion rule stored in the non-volatile memory.

8. A printing system, comprising:

a printing device having an external interface, a non-volatile memory, and a computer; and an information processing device, wherein the computer is configured to obtain a print job containing PJL data and PDL data via the external interface and perform a printing process in accordance with the obtained print job, wherein the non-volatile memory stores a conversion rule in which non-target PJL data that is not supported by the printing device and target PDL data that is supported by the printing device, and wherein the computer is configured to perform:

obtaining the print job via the external interface;

in a case where the PJL data contained in the print job obtained in the obtaining matches the non-target PJL data registered with the conversion rule stored in the non-volatile memory, converting the PJL data to the target PDL data associated with the non-target PJL data that matches the PJL data in the conversion rule;

the printing process using the target PDL that is converted, in the converting, from the non-target PJL data contained in the print job obtained in the obtaining; and when the PJL data contained in the print job obtained in the obtaining matches the non-target PJL data registered with the conversion rule stored in the non-volatile memory, no process according to the PJL data itself that is targeted for matching.

9. A non-transitory computer-readable storage medium for a printing device having an external interface, a non-volatile memory, and a computer, wherein the computer is configured to obtain a print job containing PJL data and PDL data via the external interface and perform a printing process in accordance with the obtained print job, wherein the non-volatile memory stores a conversion rule in which non-target PJL data that is not supported by the printing device and target PDL data that is supported by the printing device, and wherein the non-transitory computer-readable storage medium contains computer-executable instructions which cause, when executed by the computer, the printing device to perform:

obtaining the print job via the external interface;

in a case where the PJL data contained in the print job obtained in the obtaining matches the non-target PJL data registered with the conversion rule stored in the non-volatile memory, converting the PJL data to the target PDL data associated with the non-target PJL data that matches the PJL data in the conversion rule;

the printing process using target the PDL that is converted, in the converting, from non-target PJL data contained in the print job obtained in the obtaining; and when the PJL data contained in the print job obtained in the obtaining matches the non-target PJL data registered with the conversion rule stored in the non-volatile memory, no process according to the PJL data itself that is targeted for matching.

\* \* \* \* \*